(12) United States Patent
Taich et al.

(10) Patent No.: US 8,804,582 B1
(45) Date of Patent: *Aug. 12, 2014

(54) MASTER/SLAVE TRANSCEIVER POWER BACK-OFF

(71) Applicant: Aquantia Corporation, Milpitas, CA (US)

(72) Inventors: Dimitry Taich, San Jose, CA (US); Jose Tellado, Mountain View, CA (US)

(73) Assignee: Aquantia Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,551

(22) Filed: Aug. 23, 2013

Related U.S. Application Data

(63) Continuation of application No. 12/941,039, filed on Nov. 6, 2010, now Pat. No. 8,520,562, which is a continuation of application No. 11/438,177, filed on May 22, 2006, now Pat. No. 7,860,020.

(51) Int. Cl.
*H04B 1/44* (2006.01)

(52) U.S. Cl.
USPC ............................. 370/282; 370/252; 709/203

(58) Field of Classification Search
CPC .................................................... H04L 49/352
See application file for complete search history.

(56) References Cited

U.S. PATENT DOCUMENTS

| 6,377,640 | B2 | 4/2002 | Trans |
| 6,467,092 | B1 | 10/2002 | Geile et al. |
| 6,532,277 | B2 | 3/2003 | Ulanskas et al. |
| 6,922,448 | B1 | 7/2005 | Jacobsen et al. |
| 7,106,833 | B2 | 9/2006 | Kerpez |
| 7,113,491 | B2 | 9/2006 | Graziano et al. |
| 7,158,563 | B2 | 1/2007 | Ginis et al. |
| 7,353,007 | B2 | 4/2008 | Carballo et al. |
| 7,664,254 | B2 | 2/2010 | Bostoen et al. |
| 7,697,408 | B2 | 4/2010 | Schneider et al. |
| 7,711,530 | B2 | 5/2010 | Cioffi et al. |
| 7,936,778 | B2 | 5/2011 | Ungerboeck et al. |
| 2001/0012321 | A1 | 8/2001 | Terry |

(Continued)

FOREIGN PATENT DOCUMENTS

WO    WO00/21204    4/2000

OTHER PUBLICATIONS

Zimmerman et al., IEEE Power Backoff, Solarflare,Teranetics, Feb. 19, 2005, 12 pages.
Zimmerman et al., IEEE Power Backoff, Mar. 15, 2005, 16 pages.

*Primary Examiner* — Jianye Wu
(74) *Attorney, Agent, or Firm* — Lance Kreisman; Peninsula Patent Group (57) ABSTRACT

An apparatuses and methods of setting power back-off of a master transceiver and a slave transceiver is disclosed. One example of a method includes the master transceiver determining a master power back-off, and the slave transceiver determining a slave power back-off based on signals received from the master transceiver, and based on the master power back-off. One example of an apparatus includes a master transceiver and slave transceiver system. The slave transceiver is connected to the master transceiver through a cable. The master transceiver includes means for determining a master power back-off. The slave transceiver includes means for determining a slave power back-off based on signals received from the master transceiver, and based on the master power back-off.

21 Claims, 6 Drawing Sheets

(56) References Cited

U.S. PATENT DOCUMENTS

| | | |
|---|---|---|
| 2004/0114503 A1* | 6/2004 | Schneider et al. ............ 370/201 |
| 2004/0136463 A1 | 7/2004 | Tzannes |
| 2005/0245216 A1 | 11/2005 | Boos |
| 2006/0153106 A1 | 7/2006 | Laakso et al. |
| 2007/0076722 A1* | 4/2007 | Ungerboeck et al. ...... 370/395.2 |
| 2007/0140289 A1* | 6/2007 | Tellado et al. ................ 370/445 |
| 2007/0258514 A1 | 11/2007 | Wajcer et al. |
| 2007/0269022 A1 | 11/2007 | Taich et al. |
| 2008/0096512 A1 | 4/2008 | Mezer et al. |
| 2008/0160915 A1 | 7/2008 | Sommer et al. |
| 2008/0205609 A1 | 8/2008 | Zhou |
| 2008/0220725 A1 | 9/2008 | Schedelbeck et al. |
| 2010/0027601 A1 | 2/2010 | Fang |
| 2010/0177855 A1 | 7/2010 | Ashikhmin et al. |
| 2011/0142111 A1 | 6/2011 | Sands et al. |

* cited by examiner

MASTER/SLAVE TRANSCEIVER POWER BACK-OFF

RELATED APPLICATIONS

This application is a continuation of U.S. patent application Ser. No. 12/941,039, filed Nov. 6, 2010 which is a continuation of Ser. No. 11/438,177, filed May 22, 2006, now U.S. Pat. No. 7,860,020, issued Dec. 28, 2012; the aforementioned priority applications are hereby incorporated by reference in their entirety for all purposes.

FIELD OF THE INVENTION

The invention relates generally to communication systems. More particularly, the invention relates to setting master and slave transceiver power back-off.

BACKGROUND OF THE INVENTION

High-speed networks are continually evolving. The evolution includes a continuing advancement in the operational speed of the networks. The network implementation of choice that has emerged is Ethernet networks physically connected over twisted pair wiring. Ethernet in its BASE-T forms is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates, such as specified by 10 GBASE-T.

Figure 1:
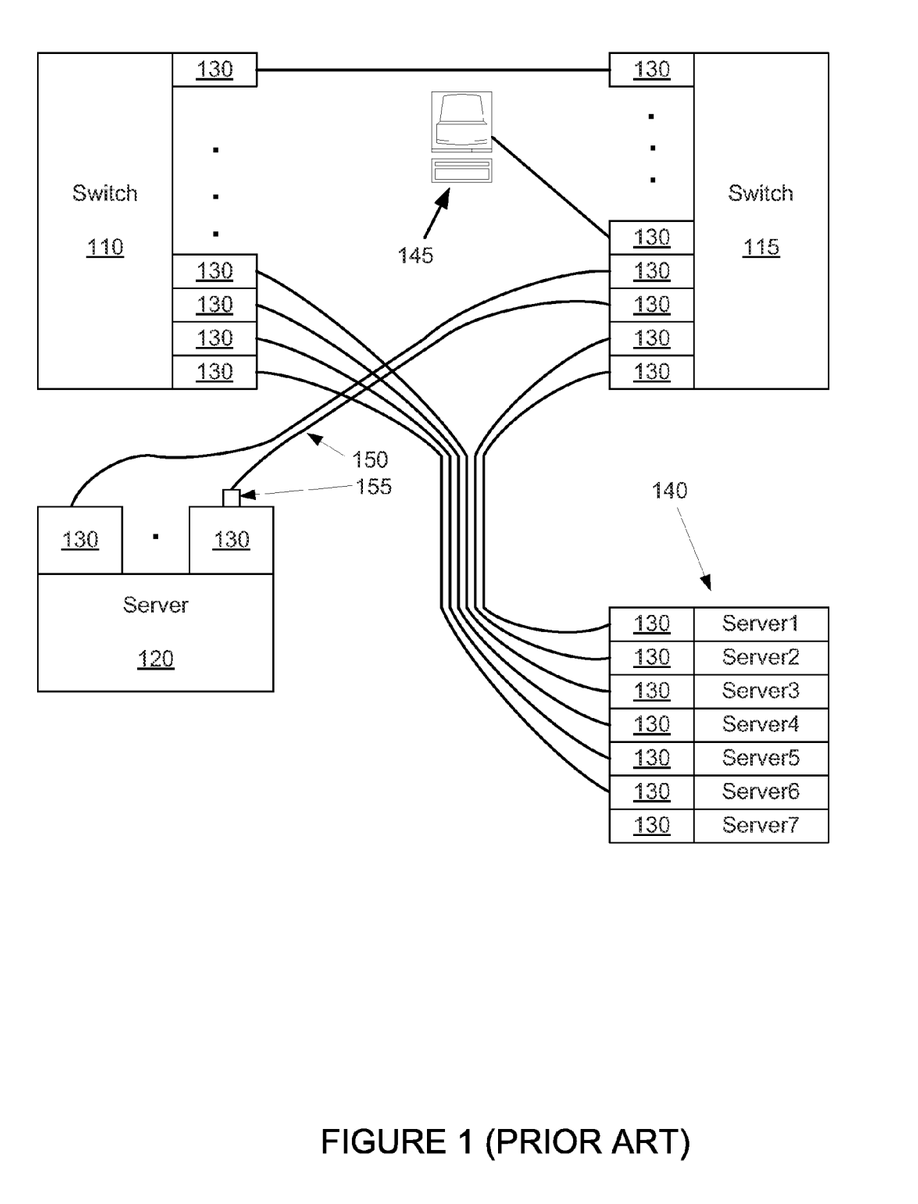
FIG. 1 shows a network of wired devices that suffer from crosstalk between cables and connectors between the devices.

FIG. 1 shows a block diagram of an Ethernet system. This system includes switches 110, 115, a server 120, a set of blade servers 140, and a personal computer 145. Each of the Ethernet devices 110, 115, 120, 140 includes Ethernet transceivers 130 which enable transmission of Ethernet signals between the devices 110, 115, 120, 140. The signal transmission is over Ethernet transmission channels that are provided by cables and connectors, such as cable 150 and connector 155.

Cables and connectors located proximate to each other can suffer from coupling of signals from one cable and connector to another cable and connector. The coupling is referred to as crosstalk, and is undesirable because crosstalk signals can interfere with intended transmission signals. Crosstalk signals become more prominent as transmission frequencies increase. Therefore, as Ethernet system progresses to 10 GBASE-T, crosstalk signals become a greater problem.

One way to reduce the effects of crosstalk is to reduce the signal level of transmission signals. Lower amplitude transmission signals result in lower amplitude crosstalk, and therefore, cause less interference. However, transmission signal amplitude reduction can cause other problems. The transmission can be made unreliable by reducing the transmission signal amplitude because the SNR (signal to noise ratio) is typically decreased.

One proposed method of reducing transmission signal amplitude to minimize crosstalk is to determine the worst case crosstalk within a network. The signal amplitude of all transmitters within the network is reduced until the worst case crosstalk meets a predetermined threshold. The amplitudes of transmission signals of the entire network are reduced to the worst case, to ensure that the crosstalk of the entire network meets the crosstalk threshold. This solution is inefficient, however, because the transmission channels (cables) of most of the network can have much greater transmission signal amplitudes without causing crosstalk problems. As a result, data transmission within the system suffers excessively.

It is desirable to have a system, apparatus and method of adjusting transmission signal amplitudes (power back-off) of a master transceiver and a slave transceiver within the network. The power back-off is desirably adjusted to allow the transmission signal amplitude to be as low as possible while still meeting the desired SINR (signal to interference and noise ratio) threshold necessary to establish a reliable communication link.

SUMMARY OF THE INVENTION

An embodiment includes a method of setting power back-off of a master transceiver and a slave transceiver, the master transceiver and the slave transceiver being connected by a cable. The method includes the master transceiver determining a master power back-off, and the slave transceiver determining a slave power back-off based on signals transmitted by the master transceiver, and based on the master power back-off.

Another embodiment includes a system. The system includes a master transceiver, and a slave transceiver, wherein the slave transceiver is connected to the master transceiver through a cable. The master transceiver includes means for determining a master power back-off. The slave transceiver includes means for determining a slave power back-off based on signals received from the master transceiver, and based on the master power back-off.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for setting power back-off of a master transceiver and a slave transceiver within a network. The power back-off of both transceivers can be adjusted to improve crosstalk between links of the network.

It is to be appreciated that the present teaching is by way of example, not by limitation. Therefore, although the embodiments described herein are for convenience of explanation, it is to be appreciated that the principles herein may be applied equally to other configurations of transmitter power back-off methods.

Ethernet systems include multiple high-speed ports that can potentially interfere with each other. These systems include links (cables and connectors) of varying lengths. The links are typically bundled together, may cause long and short links to be proximate when included within a common bundle. As a result, transmitters associated with short links typically transmit signals that interfere (generally referred to as alien crosstalk) with signals being transmitted over long links. A typical worst cased alien crosstalk scenario occurs when short channel includes a transmitter (alien disturber) located very close to a receiver (victim) of a very long channel. Transmission signals tend to attenuate proportional to the length of the link that the signals are traveling over. In the situation where a short link is located near a long link, the transmitted signal of the long link can be very weak by the time it reaches the intended receiver, whereas the alien signal (alien near end crosstalk (ANEXT) and alien far end crosstalk (AFEXT)) of the short link can be strong. To minimize the alien signal crosstalk, the transmitter of the short link can reduce its transmission signal power through power back-off. A link partner of the short link can typically operate with a lower transmitted signal power because less attenuation is experienced by the transmission signals of the short link. The power back-off, however, reduces the ANEXT and AFEXT of the long link caused by the short link.

The power back-off setting is typically determined by a transceiver based on signals received from a link partner. The power back-off is generally selected based on signal strength of the received signals, and/or the amount of noise and interference (crosstalk) of the received signals. When transmitting similar power level signals in both directions of link partners, the received signal at each link partner transceiver may be similar, but the power back-off estimates may be limited in quality. For example, for a full-duplex system, the power back-off can be determined while each transmitter is simultaneously transmitting signals, and the received signals may include relatively large amounts of local return signals (echo and NEXT). The presence of the NEXT and echo signals are likely to reduce the quality of the power back-off determinations.

The master transceiver and the slave transceiver being subjected to different levels of ANEXT and AFEXT interference can also lead to asymmetrical power back-off settings. Since the power back-off settings are selected based on (among other parameters) measured SINR values, varying the number of active ports (other transceivers) proximate to the master and slave transceivers generally result in different power back-off settings for the master transceiver and the slave transceiver. Additionally, once the master and slave transceivers are embedded as a communication port of a specific application platform (such as a switch, server, or network interface card) the transceivers typically assume worst case alien crosstalk since the density of adjacent ports can vary greatly in these applications. Generally, in these systems the power back-off is estimated with a range because the transceivers typically cannot determine the amount of additional crosstalk that adjacent ports generate once the ports are activated. The range can vary depending on the application in which the transceivers are used.

Asymmetrical Links

The power back-off determinations of a pair of transceivers of a bi-directional link can be quite different. That is, a first transceiver of the pair may determine a power back-off that is very different than the power back-off determination of the second transceiver. This leads to asymmetrical links. For example, if the first transceiver requests a power back-off of N dB, and the second transceiver requests a power back-off of N+6 dB, then the first transceiver transmits 6 dB less signal power. Therefore, the second transceiver must operate with a signal to echo/NEXT interference ratio that is 6 dB lower than if both link partners were transmitting with the same signal power. The first transceiver will have a signal to echo/NEXT ratio that is about 6 dB higher due to the reduced signal strength of the second transceiver. Therefore, the signal to echo/NEXT ratio imbalance between the two transceivers is actually 12 dB. This disparity in signal to echo/NEXT or self-interference can cause the link between the first and second transceivers to be reliable in one direction, and unreliable in the other direction. Therefore, it is desirable to maintain at least some symmetry between the signal powers in the two directions of the link.

Figure 2:
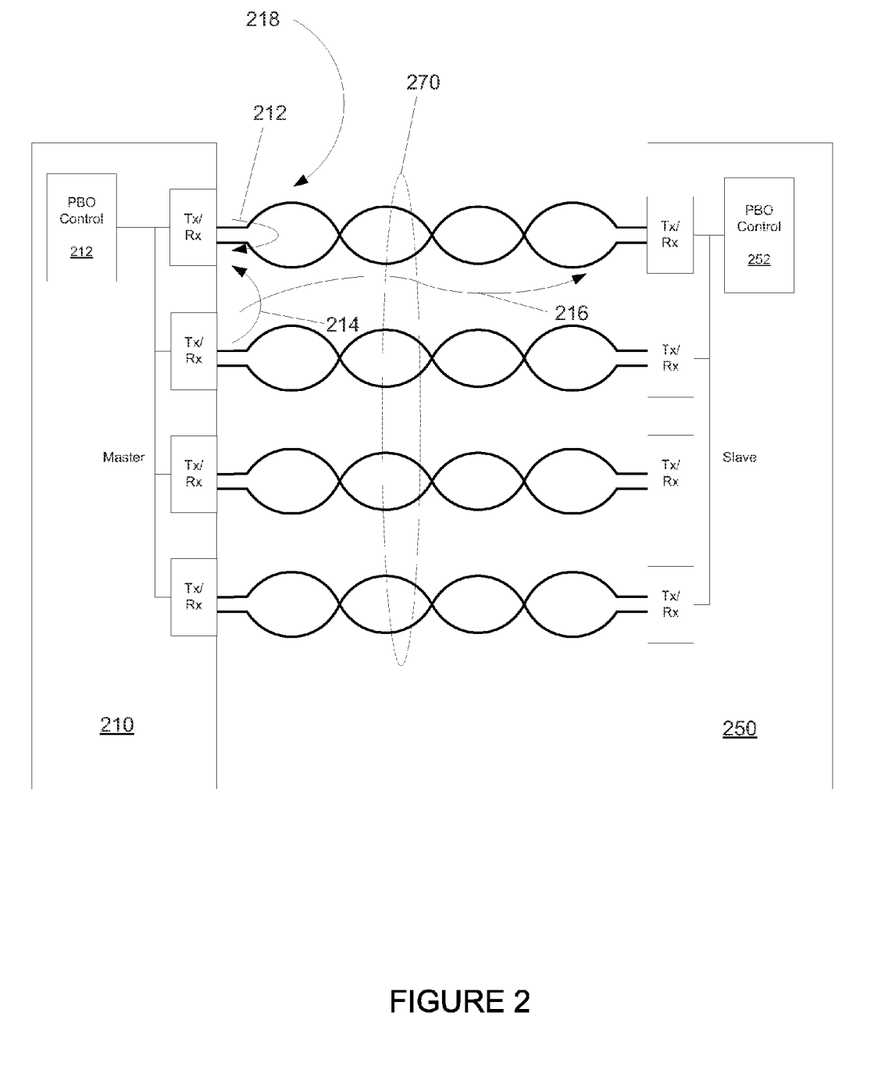
FIG. 2 shows one example of a master transceiver and a slave transceiver connected by a cable (for example, four twisted pairs of copper wire) that can benefit from methods of setting power back-off.

FIG. 2 shows one example of a master transceiver 210 including a power back-off controller 212, and a slave transceiver 250 including a power back-off controller 252, connected by a cable 270 (four twisted pairs of copper wire) that can benefit from methods of setting power back-off.

The embodiment of FIG. 2 shows the cable 270 including four twisted pairs of copper. However, it is to be understood that the methods of setting power back-off of a master and a slave transceiver can be applied to many different cable types. For example, the cable 270 can be a copper cable such as CAT5, CAT6, CAT7 or the cable 270 can be a DSL, or a single or multi-mode optical fiber.

As previously described, power back-off can be applied to a transmitter (as located within the transceivers 210, 250) to reduce transmit power to a level which provides enough signal power for the receiver to properly operate, but still lower than the maximum available power. Reducing the transmit power level reduces the possibility of interfering with other transceivers. However, as will be discussed, reducing the transmit power of transmission signals can make the receiver of the transmission signals more susceptible to, for example, alien crosstalk.

The determination of which of the transceivers is a master transceiver and which is a slave transceiver can be established during a startup process. The master transceiver can be designated as the first transceiver, and initiates the power back-off exchange. Ethernet transceivers typically go through an auto-negotiation period that includes a series of hand-shakes to establish basic operating criteria. One of the criteria can include determining which transceiver is the master, and which transceiver is the slave. It is to be understood that the master and slave relationship can be determined outside of the auto-negotiation process.

The power back-off (master power back-off) of the master transceiver provides the slave transceiver with guidance on how to back-off the transmission power of signals being transmitted from the slave transceiver to the master transceiver. The master transceiver communicates the master power back-off to the slave transceiver. The slave transceiver regulates power of signals transmitted by the slave transceiver with the master power back-off.

The master power back-off deceases the signal power level of signals transmitted from the slave transceiver and reduces crosstalk from the slave transceiver to the master transceiver (FEXT), and reduces self interference of the slave transceiver (echo and NEXT). A first arrow 212 shows echo interference, a second arrow 214 shows NEXT interference and a third arrow 216 shows FEXT interference. Signals from other links can also couple onto the master and slave transceivers in the form of alien crosstalk 218 (alien NEXT and alien FEXT).

Increasing the power back-off decreases the transmitted signal power. The power back-off should be limited from being so great that the receiving transceiver cannot properly receive signals.

The power back-off (slave power back-off) of the slave transceiver provides the master transceiver with guidance on how to back-off the transmission power of signals being transmitted from the master transceiver to the slave transceiver. That is, the slave transceiver communicates the slave power back-off to the master transceiver. The master transceiver regulates power of signals transmitted by the master transceiver with the slave power back-off.

Due to the reasons described above regarding the setting of power back-off (master and slave) it is desirable that the master power back-off not be appreciably different than the slave power back-off. The methods described provide master and slave power back-off settings that do not differ radically.

Figure 3:
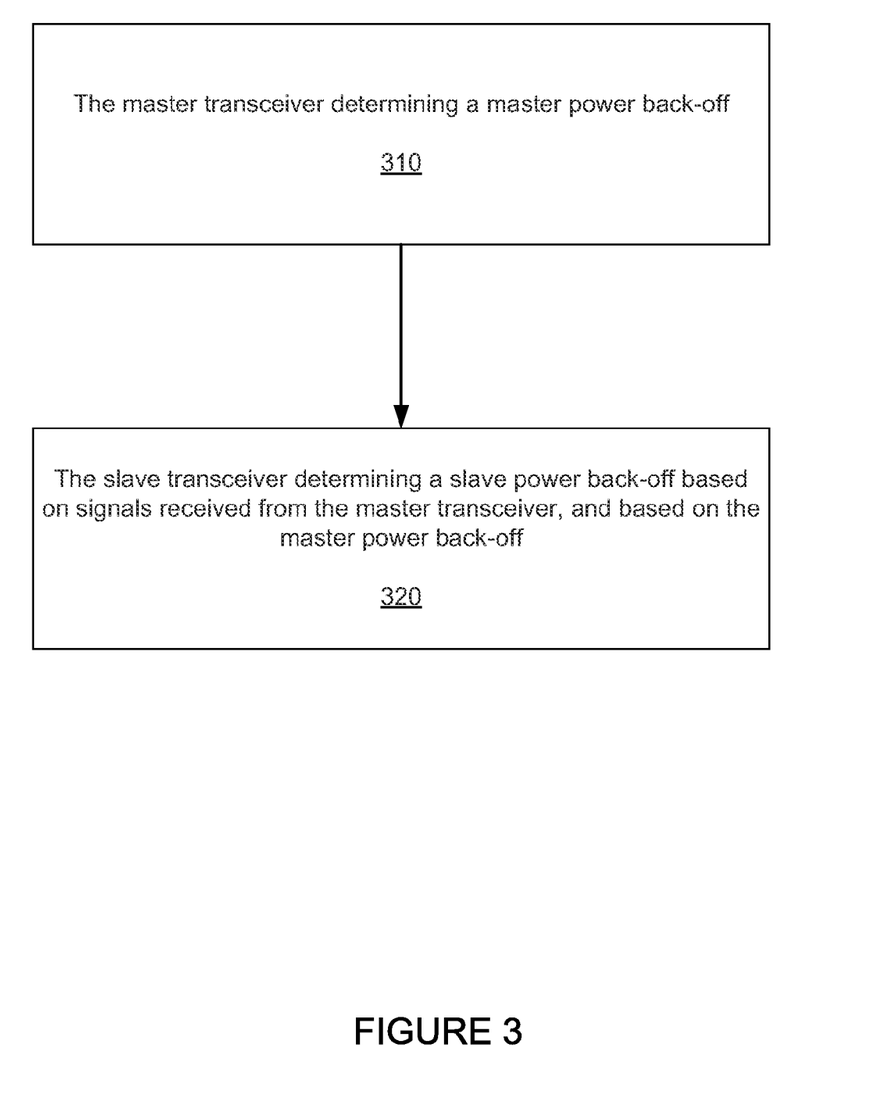
FIG. 3 is a flow chart showing steps of one example of a method of setting power back-off of a master transceiver and a slave transceiver.

FIG. 3 is a flow chart showing steps of one example of a method of setting power back-off of a master transceiver and a slave transceiver. A first step 310 of the method includes the master transceiver determining a master power back-off. A second step 320 includes the slave transceiver determining a slave power back-off based on signals received from the master transceiver, and based on the master Power back-off.

Determining the Master Power Back-Off

One example of determining the master power back-off includes the master transceiver receiving signals transmitted from the slave transceiver. The master transceiver measures the signal strength of the received signals, and compares the received signal strength with a desired received signal strength. The desired received signal strength can be determined from look up table (LUT). The desired signal strength can be determined by knowing a desired signal to interference and noise ratio (SINR). Based on the measured and the desired received signal strength, the master transceiver can determine a master power back-off. The master transceiver communicates the master power back-off to the slave transceiver so that the slave can adjust the transmission signal power accordingly. Determining the master power back-off includes, to at least some extent, determining the master power back-off to ensure a desire signal quality of signal received by the master transceiver, and to limit the amount of alien crosstalk with other transceivers. The desired signal quality typically includes at least one of signal power, or estimated SNR or BER (bit error rate) or FER (frame error rate) of received signals.

The master power back-off determination can be enhanced by measuring the power of received signals as a function of frequency. For example, by measuring and/or estimating the power spectral density (PSD) of the received signals. The PSD can be determined at several key frequencies (for example, at the Nyquist frequency, half the Nyquist frequency and a tenth of the Nyquist frequency). A shape of the PSD can provide a basis for estimating cable lengths which can be used for determining the power back-off.

Other methods can be used for determining the master power back-off. For example, the master transceiver determines the master power back-off based on a time-domain-reflection procedure. That is, the master transceiver can transmit signals and based on of reflections of the transmitted signals, the master transceiver can determine the master power back-off. The determination can be based on lengths of the links as determined by timing of the reflections. The master transceiver can look up a power back-off setting based on the estimated length of the link. Basically, the attenuation is estimated based upon an estimated length. Based on the attenuation, a power back-off is selected.

Other embodiments include the master transceiver receiving the master power back-off from a user, or a higher level management control layer. Additionally, the master transceiver can base the master power back-of at least in part based on the slave power back-off determined by the slave transceiver. The master power back-off can be calculated through simulation and verified experimentally.

The master transceiver can determine the master power back-off by determining a minimum power back-off from signals received from the slave transceiver, and selecting a master power back-off in a range (master power back-off select range) set by the minimum power back-off and a maximum power back-off.

The master transceiver can determine the master power back-off by determining a minimum power back-off from signals received from the slave transceiver, and selecting a master power back-off within a range of the minimum power back-off and the minimum power back-off plus a predetermined range, wherein the minimum power back-off plus the range is not greater than a predetermined maximum allowable power back-off. The range can be pre-determined through simulation and verified experimentally.

Determining the Slave Power Back-Off

Generally, the slave transceiver can use the same methods of determining the slave power back-off as the master transceiver, but the slave transceiver additionally uses the value of the master transceiver power back-off. For example, one embodiment includes the slave transceiver receiving the master power back-off, and setting the value of the slave power back-off to be within a predetermined range of the value of the master power back-off. This ensures that the slave power back-off and the master power-off do not deviate from each other too much, thereby maintaining relative symmetry between the power of the transmission signals of the master transceiver and the slave transceiver. Determining the slave power back-off includes to at least some extent, determining the slave power back-off to ensure a desired signal quality of signal received by the slave transceiver.

The slave transceiver can determine the slave power back-off by determining a minimum power back-off from signals received from the master transceiver, and selecting a slave power back-off in a range set by the minimum power back-off and a maximum power back-off.

The slave transceiver can determine the slave power back-off by determining a minimum power back-off from signals received from the master transceiver, and selecting a slave power back-off within a range of the minimum power back-off and the minimum power back-off plus a predetermined range, wherein the minimum power back-off plus the range is not greater than a predetermined maximum allowable power back-off.

For one embodiment, the slave transceiver determining a slave power back-off based on signals transmitted by the master transceiver, and based on the master power back-off includes the slave transceiver receiving the master power back-off, and the slave transceiver determining the slave power back-off within a predetermined range of the master power back-off, based on signals transmitted by the master transceiver. If the slave transceiver cannot determine a slave power back-off value within the predetermined range, then information regarding this occurrence is stored for future interactions (including, for example, future auto-negotiations) between these link partners.

For another embodiment, the slave transceiver determining a slave power back-off based on signals transmitted by the master transceiver at a known power level, and based on the master power back-off includes the slave transceiver determining a first estimate slave power back-off based on signals transmitted by the master transceiver at a known power level. If the first estimated slave power back-off is within a predetermined range of the master power back-off, then setting the slave power back-off to be the first estimate slave power back-off. If the first estimated slave power back-off is not within the predetermined range, then setting the slave power back-off to be within the predetermined range. If the first estimate slave power back-off is not within the predetermined range, then this occurrence can be stored for future interactions between master and slave link partners.

Figure 4:
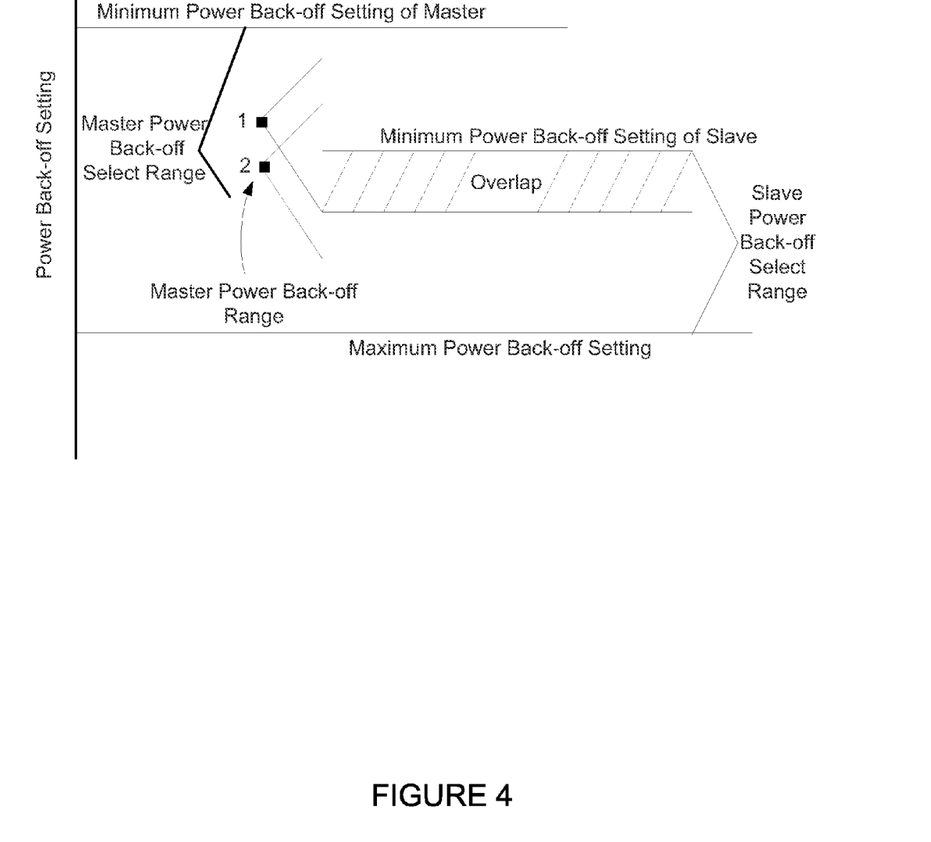
FIG. 4 shows a plot of power back-off settings including minimum power back-off, maximum power back-off and ranges of power back-off.

FIG. 4 is a plot showing representations of minimum power back-off, maximum power back-off and power back-off ranges.

Maximum Power Back-Off

The maximum power back-off (shown in FIG. 4) provides a maximum level of attenuation of signals transmitted from either the master or the slave transceiver. The more a transmission signal is attenuated (backed-off), the less the transmission signal interferes with other transmission signals. However, too much attenuation can decrease the signal to noise/interference ratio to the point that the transmission signal cannot be properly received by a link partner.

Generally, for a given link, a minimum received signal power to ensure reasonable operation of the system can be established. This minimum received signal power can be used to limit the maximum power back-off. The maximum power back-off can be determined through simulation, and verified experimentally.

Minimum Power Back-Off

The minimum power back-off (shown in FIG. 4) provides a minimum level of attenuation of signals transmitted from either the master or the slave transceiver. FIG. 4 shows a minimum power back-off setting for the master transceiver and a minimum power back-off setting for the slave transceiver. The less a transmission signal is attenuated, the more likely it is that the transmission signal will interfere with other transmission signals. However, the additional signal power provides transmission signals having a greater SINR, but greater alien crosstalk.

Ranges of Power Back-off

FIG. 4 shows three possible ranges. A first range is a master power back-off select range. A second range is the master power back-off range which can be communicated to the slave transceiver. A third range is a slave power back-off select range. The primary purpose for designating ranges is to ensure that the master power back-off and the slave power back-off do not deviate too much. That is, the selection of ranges prevents the master and slave transceivers from independently selecting power back-offs that are very different, resulting in the previously described asymmetric links.

The master power back-off select range provides a range from which the master transceiver can select a master power back-off The selected master power back-off can vary with different iterations of master power back-off selections. As shown in FIG. 4, the master transceiver can select, for example, a master power back-off "1".

The master transceiver sends the master power back-off to the slave transceiver. For example, the master transceiver can send the master power back-off "1" of FIG. 4 to the slave transceiver. The slave transceiver then selects the slave power back-off at least in part based on the master power back-off.

The slave power back-off selection can be additionally constrained to be within a range of the master power back-off. The range can be a predetermined range, or the range can be received from the master transceiver in the form of a master power back-off range.

In one embodiment, the master power back-off range is a range that is initially proposed by the master transceiver along with, for example, a minimum power back-off setting. The slave transceiver can determine, for example, a minimum power back-off, and calculate a slave power back-off select range. The slave power back-off select range can be defined by a slave power back-off minimum and a slave power back-off maximum. The slave transceiver can then select a power back-off within an overlap of the master power back-off range and the slave power back-off select range as shown in FIG. 4.

If the slave transceiver cannot select a power back-off within the two ranges (the master power back-off range and the slave power back-off select range), then this information is stored for a future interactions between the transceivers. That is, if the master power back-off range and the slave power back-off select range do not overlap, then the slave transceiver cannot select a power back-off within the two ranges. This situation suggests making a reasonable compromise on the ranges. The compromise can be made by increasing the power back-off ranges so that the slave transceiver is able to re-select the power back-off within the master power back-off range.

Alternatively, the master transceiver can select a different master power back-off within the master power back-off select range (such as, master power back-off "2" as shown in FIG. 4). The different master power back-off and associated master power back-off range can provide the slave transceiver with enough overlap between the master power back-off range and the slave range to make as acceptable slave power back-off selection.

Interactive Power Back-off Determinations of the Master and Slave Transceivers

The determination of which transceiver of link partners is the master transceiver and which is the slave transceiver can be determined during initialization of the transceivers. For example, for Ethernet transceivers, auto-negotiation establishes a transmission link between link partner transceivers, and can designate a first transceiver as the master transceiver and designate a second transceiver as the slave transceiver.

As previously stated, the initialization process (and/or future interactions) can benefit from past power back-off interactions between the master and slave transceivers. If a slave power back-off could not be selected within a range of the master power back-off, the range can be changed to increase the chances that the slave transceiver is able to re-select within the range. Alternatively, the master transceiver can select a new master power back-off that is more likely to allow the slave transceiver to select a slave power back-off that is within the range of the master power back-off.

When the slave transceiver is unable to select a slave power back-off within the master power back-off range, the slave transceiver can report a preferred power back-off range to the master. There are several different tactics the master can use during the next interactions between the master transceiver and the slave transceiver to ensure that the master power back-off range and the slave power back-off range overlap.

If the slave power back-off range is above the master power back-off range (the slave transceiver requires less power back-off than the master transceiver), the master transceiver can modify the master power back-off range by either shifting the whole master power back-off range toward the slave transceiver power back-off range, or by extending the upper limit of the master power back-off range.

If the slave power back-off is below the master power back-off range (the slave transceiver requires more power back-off than the master transceiver), the master transceiver can modify the master power back-off range by either shifting the whole master power back-off range towards the slave power back-off range, or by extending the lower limit of the master power back-off range.

More sophisticated schemes can include determining a gap size between the master power back-off range and the slave power back-off range, and then shifting both the master power back-off and the slave power back-off towards each other. This can ensure that both the master transceiver and the slave transceiver compromise their desired ranges in a nearly symmetrical way.

Simultaneous Setting of Master and Slave Power Back-off

One embodiment of master and slave power back-off setting includes the master transceiver starting regulation of the power of signals transmitted by the master transceiver simultaneous with the slave transceiver starting regulation of the power of signals transmitted by the slave transceiver.

Synchronization between master and slave transceivers is generally required to ensure reliable initialization between the master and slayer link partners. The link partners should be made aware of each others status. A common method of obtaining synchronization between the master and slave transceiver link partners is for the transceivers to exchange transceiver status information and running counter values. The counter values can be used to allow each transceiver to lock to the running counter values. Current status information of a link partner allows for a reliable prediction of next stage and/or action by the link partner. Locking of the running counters of each link partner allows the transceivers (master and slave) to change states simultaneously and/or take necessary actions in a timely manner when a link partner changes transmission parameters.

When synchronization has been obtained, each transceiver knows exactly when the other transceiver is going to begin regulating transmit signals with the selected power back-off. Simultaneous application of the master and slave power back-offs is desirable because situations in which there is a large transitional imbalance between power back-offs of the transceivers can be avoided. Simultaneous application of the master and slave power back-offs is also desirable because the transceivers typically require readjustment of parameters after a transmitter power change.

Figure 5:
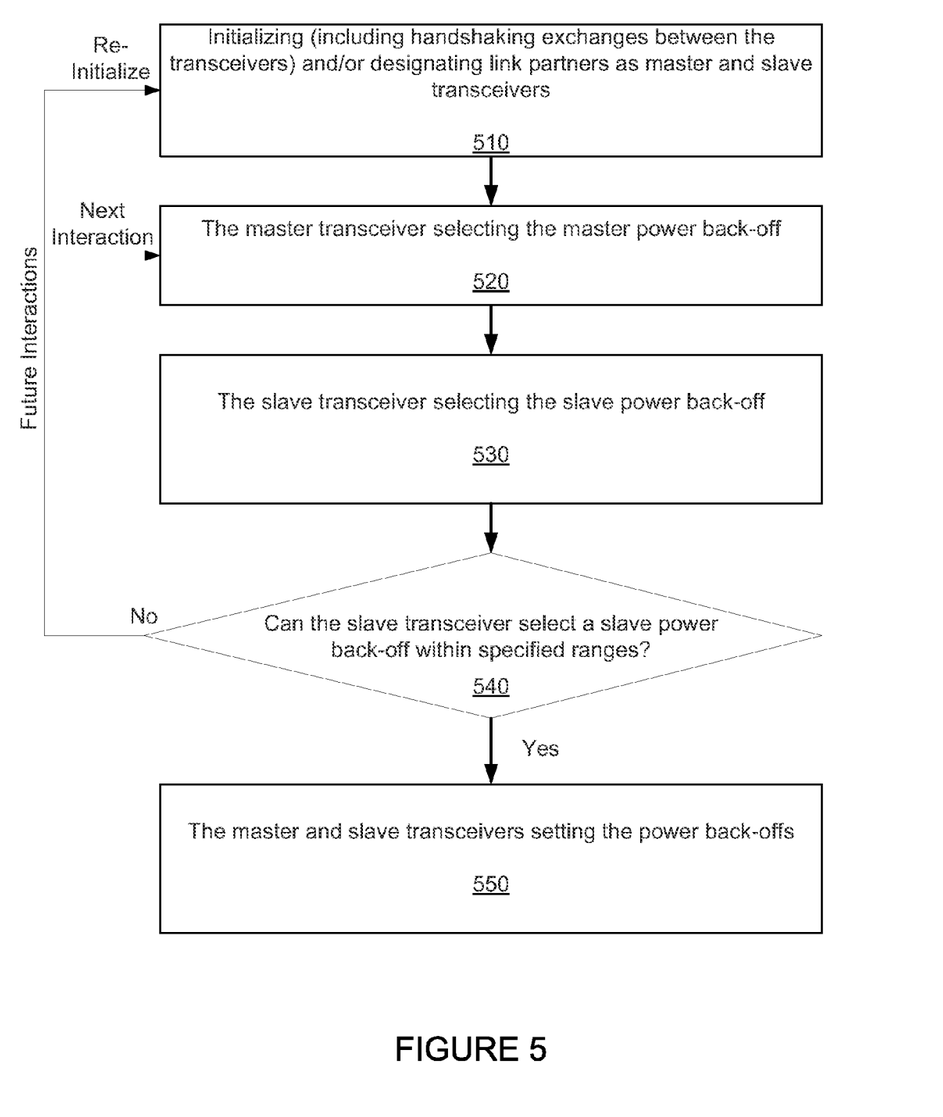
FIG. 5 is a flow chart showing steps of another example of a method of selecting master and slave transceiver back-offs.

FIG. 5 is a flow chart showing steps of another example of a Method of selecting master and slave transceiver back-offs. A first step 510 includes initializing (including handshaking exchanges between the transceivers) and designating link partners as master and slave transceivers. A second step 520 includes the master transceiver selecting the master power back-off. The power back-off ranges, minimum and/or maximum can be specified at this point. If power back-offs have been determined previously, knowledge of the previous determinations can be used to modify or update the specified ranges, minimum and/or maximum power back-offs. A third step 530 includes the slave transceiver selecting the slave power back-off within the specified ranges. A fourth step 540 includes determining whether the slave transceiver was able to select a slave power back-off within specified ranges (for example, within the overlap shown on FIG. 4). If not, the initialization (or a next interaction which does not require a full initialization) is executed again with different ranges or a different master power back-off selection. If the slave is able to select a slave power back-off within the specified ranges, a fifth step 550 includes the master and slave transceivers setting the power back-offs.

Figure 6:
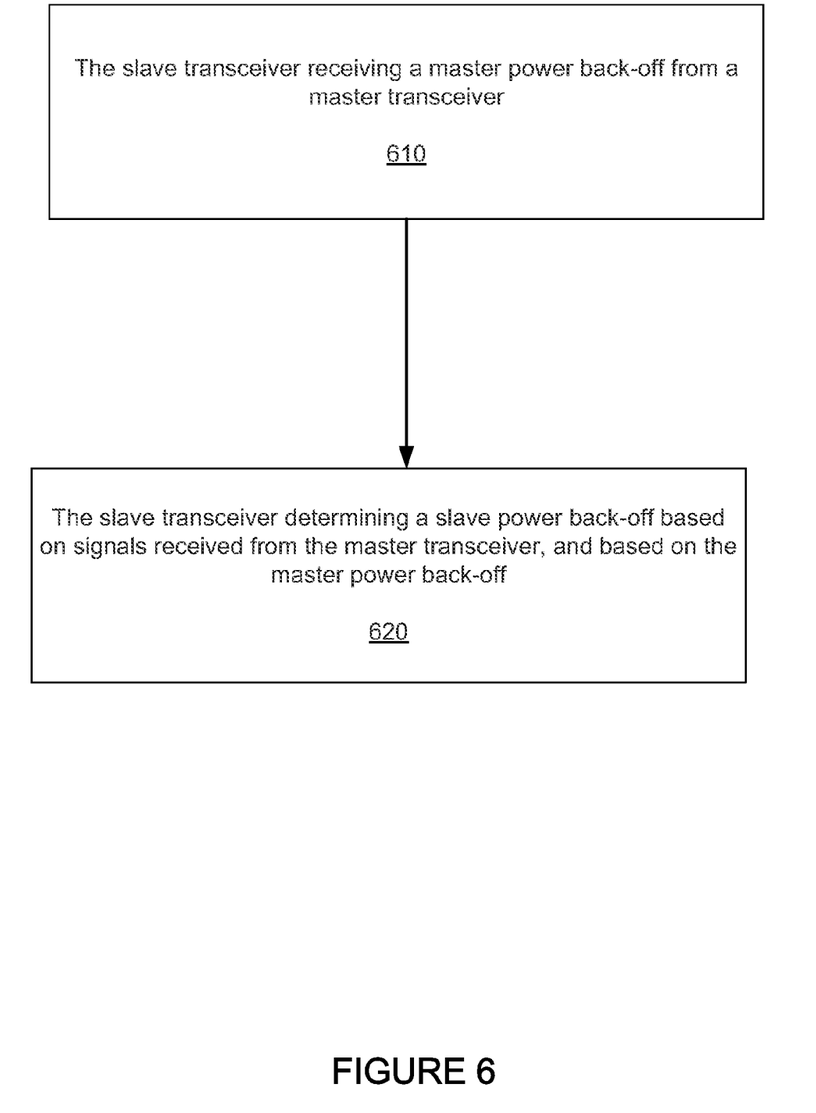
FIG. 6 is a flow chart showing steps of one example of a method of setting power back-off of a slave transceiver.

FIG. 6 is a flow chart showing steps of one example of a method of setting power back-off of a slave transceiver. A first step 610 includes the slave transceiver receiving a master power back-off from a master transceiver. A second step 620 includes the slave transceiver determining a slave power back-off based on signals transmitted by the master transceiver at a known power level, and based on the master power back-off.

One example of slave transceiver determining a slave power back-off based on signals transmitted by the master transceiver, and based on the master power back-off includes the slave transceiver determining the slave power back-off within a predetermined range of the master power back-off, based on signals transmitted by the master transceiver. If the slave transceiver cannot determine a slave power back-off value within the predetermined range, then information regarding this occurrence is stored for future interactions between master and slave link partners. If the slave transceiver cannot determine a slave power back-off value within the range, then information regarding this occurrence is stored for future interactions (which could be, for example, auto-negotiations) between master and slave link partners.

One other example of the slave transceiver determining a slave power back-off based on signals transmitted by the master transceiver, and based on the master power back-off includes the slave transceiver determining a first estimate slave power back-off based on signals transmitted by the master transceiver. If the first estimated slave power back-off is within a predetermined range of the master power back-off, then setting the slave power back-off to be the first estimate slave power back-off. If the first estimated slave power back-off is not within the predetermined range, then setting the slave power back-off to be within the predetermined range.

Although specific embodiments of the invention have been described and illustrated, the invention is not to be limited to the specific forms or arrangements of parts so described and illustrated. The invention is limited only by the appended claims.

What is claimed is:

1. A method of operation in an Ethernet transceiver, the method comprising:
   in an initialization mode
      transmitting signals to a link partner transceiver via a link;
      applying an initial power back off parameter to the signals;
      receiving a request from the link partner transceiver to adjust the initial power back off parameter, the request generated based on a detected signal power level of the signals as received by the link partner transceiver;
      adjusting the initial power back off parameter to an adjusted value in response to the request;
      setting the Ethernet transceiver power back off parameter to the adjusted value;
      communicating the adjusted value to the link partner transceiver; and
   in a normal operation mode
      transmitting first data to the link partner transceiver using the adjusted value for the power back off parameter; and
      receiving second data from the link partner transceiver, the second data having been transmitted with a power back off parameter that is constrained to be within a predefined range of the adjusted value.

2. The method according to claim 1, wherein:
during the initialization mode
identifying the Ethernet transceiver as a master device; and
identifying the link partner transceiver as a slave device.

3. The method according to claim 1, wherein a length of the link is not greater than 100 meters.

4. The method according to claim 3, wherein the Ethernet transceiver is realized as a 10 GBASE-T transceiver.

5. The method according to claim 1, further comprising:
iteratively performing the transmitting, receiving and adjusting until a threshold signal power level is detected, and a corresponding final value of the power back off parameter identified.

6. The method according to claim 5, wherein the threshold signal power level is a minimum signal power based on a desired signal power versus crosstalk parameter.

7. The method according to claim 5, wherein communicating the adjusted value includes the link parameter transceiver setting its power back off to within the predetermined range of the final value.

8. The method according to claim 1, wherein the predefined range is less than 6 db.

9. A method of operation in an Ethernet transceiver, the method comprising:
receiving transmit signals from a link partner transceiver via a link with an applied initial power back off parameter;
detecting a signal power level associated with the received transmit signals;
generating a request to adjust the initial power back off parameter based on the detected signal power level;
transmitting the request to the link partner transceiver, the link partner transceiver to adjust the power back off parameter to an adjusted value in response to receiving the request;
receiving the adjusted value of the power back off parameter for the link partner transceiver;
setting the power back off parameter for the Ethernet transceiver within a predefined level of the adjusted value set by the link partner transceiver.

10. The method according to claim 9, wherein:
the predefined range of values is less than 6 db within the final value.

11. The method according to claim 9, wherein:
during an initialization mode
identifying the Ethernet transceiver as a slave device; and
identifying the link partner transceiver as a master device.

12. The method according to claim 9, wherein:
detecting a signal power level includes determining the signal power of the received transmit signals using on-chip logic.

13. The method according to claim 9, and further comprising:
iteratively performing the receiving, detecting, generating and transmitting until a threshold signal power level is reached, and a corresponding final value of the power back off parameter identified for the link partner transceiver.

14. The method according to claim 11, wherein detecting a signal power level includes:
retrieving the threshold signal power level from a look-up table in the on-chip logic; and
comparing the detected signal power level to the threshold signal power level.

15. A method of setting power back off levels for first and second Ethernet transceivers coupled via an Ethernet link, the method comprising:
assigning an initial power back off to the first Ethernet transceiver;
transmitting signals from the first Ethernet transceiver to the second Ethernet transceiver,
the transmitted signals attenuated by an amount corresponding to the initial power back off;
receiving the transmitted signals at the second Ethernet transceiver;
detecting a signal power level associated with the received signals;
determining a signal power margin where the signal power may be reduced and still maintain acceptable signal quality;
if the signal power margin is above a threshold, transmitting a request from the second Ethernet transceiver to the first Ethernet transceiver, the request specifying an adjustment to the initial power back off;
setting the power back off for the first Ethernet transceiver to an adjusted value corresponding to the adjustment;
communicating the adjusted value of the power back off to the second Ethernet transceiver; and
setting the power back off for the second Ethernet transceiver to within a predetermined level of the adjusted value.

16. The method according to claim 15, further comprising:
iteratively carrying out the transmitting, receiving, detecting, and determining until the detected signal power reaches a signal power threshold.

17. The method according to claim 15, further comprising:
identifying the first Ethernet transceiver as a master device; and
identifying the second Ethernet transceiver as a slave device.

18. The method according to claim 15, wherein a length of the Ethernet link is not greater than 100 meters.

19. The method according to claim 15, wherein the first and second Ethernet transceivers are realized as 10 GBASE-T transceivers.

20. The method according to claim 15, further comprising:
iteratively performing the transmitting, receiving and adjusting until a threshold signal power level is detected, and a corresponding final value of the power back off parameter identified.

21. The method according to claim 20, wherein the threshold signal power level is a minimum signal power based on a desired signal power versus crosstalk parameter.

* * * * *